United States Patent [19]

Saxena et al.

[11] Patent Number: 5,665,823

[45] Date of Patent: Sep. 9, 1997

[54] POLYISOBUTYLENE POLYMERS HAVING ACRYLIC FUNCTIONALITY

[75] Inventors: Anil Kumar Saxena; Toshio Suzuki, both of Midland, Mich.

[73] Assignee: Dow Corning Corporation, Midland, Mich.

[21] Appl. No.: 708,070

[22] Filed: Aug. 30, 1996

[51] Int. Cl.$^6$ ...................................................... C08L 83/06
[52] U.S. Cl. ........................ 525/106; 525/288; 524/547; 524/588; 428/34
[58] Field of Search ................................ 525/106, 288; 524/507, 588; 428/34

[56] References Cited

U.S. PATENT DOCUMENTS

| | | | |
|---|---|---|---|
| 4,524,187 | 6/1985 | Greco | 525/332.1 |
| 4,665,127 | 5/1987 | Hirose | 525/100 |
| 4,758,631 | 7/1988 | Kennedy et al. | 525/245 |
| 4,764,577 | 8/1988 | Inoue | 525/409 |
| 4,808,664 | 2/1989 | Saam | 525/106 |
| 4,904,732 | 2/1990 | Iwahara | 525/100 |
| 5,120,379 | 6/1992 | Noda et al. | 156/107 |

FOREIGN PATENT DOCUMENTS

| | | |
|---|---|---|
| 7053882 | 2/1995 | Japan . |
| 7-102017 | 4/1995 | Japan . |

OTHER PUBLICATIONS

Macromers by Carbocationic Polymerization; Kennedy and Hiza; Journal of Polymer Science, vol. 21, 1033–1044 (1983).

Polymer Bulletin 6, 135–141 (1981) New Telechelic Polymers and Sequential Copolymers by Polyfunctional Initiator–Transfer Agents.

Polymer vol. 36 No. 18 1995; Butyl Rubber Graft Copolymers T. C. Chung, et al.

JMS–Pure Appl. Chem., A33(2), pp. 117–131 (1996) Poly-(Methyl Methacrylate–graft–Isobutylene).

*Primary Examiner*—Ralph H. Dean
*Attorney, Agent, or Firm*—Alexander Weitz

[57] ABSTRACT

The present invention relates to a method for preparing an acrylic-functional polyisobutylene polymer or copolymer, said method comprising reacting a polyisobutylene polymer or copolymer which contains at least one carbon-bonded silanol group in its molecule with a silane having both an acrylic-containing group and a silicon-bonded hydrolyzable group in its molecule.

23 Claims, No Drawings

POLYISOBUTYLENE POLYMERS HAVING ACRYLIC FUNCTIONALITY

FIELD OF THE INVENTION

The present invention relates to a functional polyisobutylene polymer or copolymer. More particularly, the invention relates to a method for preparing a polyisobutylene polymer in which at least about 50 mole percent of the repeat units are isobutylene units and which contains at least one acrylic-containing group in its molecule.

BACKGROUND OF THE INVENTION

Hydrocarbon polymers which contain reactive functional groups are known in the art. For example, Japanese (Kokai) 7-102017 to Kanegafuchi Chemical Industry discloses the preparation of various polymers having terminal unsaturation by reacting the corresponding hydroxyl-terminated polymer with a compound selected from an allyl halide, an acrylic acid, an oxirane ring-containing compound having carbon-carbon double bonds or a compound containing an isocyanate group and carbon-carbon double bonds in its molecule. The starting polymer, which must contain at least 1.1 hydroxyl groups per molecule, can be prepared by carrying out a chain scission of the hydrocarbon polymer chain by reacting it with ozone, followed by reduction with lithium aluminum hydride. This method for producing the hydroxy-functional precursor polymer has a disadvantage in that the chain scission results in an undesirable reduction of polymer molecular weight, as observed in Reference Example 1 of the above mentioned Kanegafuchi publication.

In another approach, allylic functionality on polyisobutylene can be converted to hydroxyl by a hydroboration-oxidation sequence. This two-stage process employs treatment of the polymer with diborane or 9-borabicyclo{3.3.1}nonane (9-BBN), followed by reaction with hydrogen peroxide, to convert C=C groups to alcohol-containing groups. Hydroboration with diborane results in some secondary hydroxyl formation, whereas 9-BBN is highly regioselective and gives only primary alcohols. Thus, this technique may be used to prepare a polyisobutylene polymer having at least one end group of the formula —CH$_2$CH$_2$CH$_2$—OH. This hydroxyl group can, in turn, be reacted with, e.g., acryloyl chloride to provide a polymer having an end group of the formula

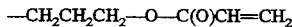

—CH$_2$CH$_2$CH$_2$—O—C(O)CH=CH$_2$

Unlike polymers which contain vinylic unsaturation, acrylic-functional polymers are highly desirable since they can be readily cured by exposure to ultraviolet (UV) radiation when formulated with a photoinitiator. They therefore find utility in coating, ink and paint applications. However, even these systems have distinct disadvantages in that the hydroboration of allyl-functional polyisobutylene is difficult. In addition to being quite expensive, the boranes are flammable and react violently with water and are therefore hazardous. Furthermore, the above mentioned oxidation of the hydroboration product by H$_2$O$_2$ adds to the complexity of this synthesis scheme.

There is therefore a need for an improved method for the production of acrylic-functional polyisobutylene (PIB), and corresponding copolymers of isobutylene, which are not plagued with the above drawbacks. Particularly, there is a need for telechelic (i.e., having two identical reactive end-groups) polymers such as telechelic acrylic-functional polyisobutylene. Such polymers having acrylic end groups can be reacted through chain extension and/or crosslinking schemes to produce cured compositions having a precise molecular weight between crosslinks, and therefore, more predictable and controllable properties than corresponding systems which contain randomly spaced reactive groups.

SUMMARY OF THE INVENTION

It has now been found that acrylic-functional PIB homopolymers and PIB copolymers, including acrylic telechelic polymers, can be prepared by a facile reaction scheme comprising reacting a silanol (i.e., —SiOH) functional PIB polymer or copolymer with a silane having at least one acrylic-containing group as well as a silicon-bonded hydrolyzable group in its molecule. A distinct advantage of the instant preparation is that the difficult and hazardous steps associated with the above mentioned methods for the synthesis of the alcohol-ended polymers of the prior art are circumvented.

The present invention therefore relates to a method for preparing the above acrylic-functional PIB polymer or copolymer, said method comprising reacting (A) a polyisobutylene polymer which contains at least one carbon-bonded silanol group in its molecule with (B) a silane having both an acrylic-containing group and a silicon-bonded hydrolyzable group in its molecule.

The invention further relates to an acrylic-functional polyisobutylene which is prepared by the above method, said acrylic-functional polyisobutylene having in its molecule at least one group of the formula

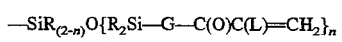

—SiR$_{(2-n)}$O{R$_2$Si—G—C(O)C(L)=CH$_2$}$_n$ wherein R is independently selected from the group consisting of a hydrocarbon group having 1 to 14 carbon atoms and a halogenated hydrocarbon group having 1 to 10 carbon atoms, G is an alkylene oxide group having 1 to 4 carbon atoms, L is selected from the group consisting of hydrogen and an alkyl radical having 1 to 4 carbon atoms and n is 1 or 2.

The invention also relates to an aqueous emulsion of the above described acrylic-functional polyisobutylene polymer or copolymer.

DETAILED DESCRIPTION OF THE INVENTION

The acrylic-functional polyisobutylene of the present invention contains at least one siloxane-bonded acrylic-containing group of the formula SiR$_{(3-n)}${OR$_2$Si—G—C(O)C(L)=CH$_2$}$_n$       (i)

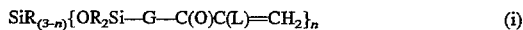

For the purposes of the invention, the term "acrylic" denotes an acryl or alkyl-substituted acryl group, as further described infra. In formula (i), R is independently selected from the group consisting of a hydrocarbon group having 1 to about 14 carbon atoms and a halogenated hydrocarbon group having 1 to 10 carbon atoms, excluding groups containing aliphatic unsaturation. R preferably contains fewer than 7 carbon atoms. Examples of suitable R radicals include alkyl radicals, such as methyl, ethyl, propyl, pentyl, octyl, undecyl and octadecyl; cycloaliphatic radicals, such as cyclohexyl and cyclooctyl; aryl radicals such as phenyl, tolyl, xylyl, benzyl, alpha-methyl styryl and 2-phenylethyl; and chlorinated hydrocarbon radicals such as 3,3,3-trifluoropropyl, 3-chloropropyl, chlorobenzyl, and dichlorophenyl. Preferably, R is selected from the group consisting of alkyl radicals having 1 to 6 carbon atoms and phenyl. Most preferably, each R is a methyl radical. G is a difunctional alkylene oxide group having 1 to 4 carbon atoms. Preferred G groups may be represented by a formula selected from the group consisting of —CH₂O—, —CH₂CH₂O—, —CH₂CH₂CH₂O— and —CH₂CH(CH₃)CH₂O—, preferably —CH₂CH₂CH₂O—. L in formula (i) is selected from the group consisting of hydrogen and an alkyl radical having 1 to 4 carbon atoms. Preferably, L is either hydrogen or a methyl radical, corresponding to acryl and methacryl functionality, respectively. In the above formula, n is 1 or 2, preferably 1.

For the purposes of the present invention, the backbone of the instant acrylic-functional polyisobutylene polymer may be any linear or branched polymer or copolymer wherein at least about 50 mole percent, preferably at least 80 mole percent, of the repeat units are isobutylene repeat units of the following structure

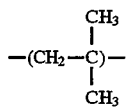

One or more hydrocarbon monomers, such as isomers of butylene, styrene, derivatives of styrene, isoprene and butadiene, may be copolymerized with the isobutylene, the preferred co-monomer being selected from 1-butene, α-methyl styrene or isoprene. Most preferably, the polymer is a homopolymer consisting essentially of isobutylene repeat units.

In the polymer or copolymer of the invention, the above described acrylic-containing group (i.e., the group shown in formula (i)) can be disposed either along the chain, at one or both terminals thereof, or any combination of the above. As used herein, the term "polymer" is generic to polymers, oligomers and copolymers, all of which are within the scope of the instant invention. However, in order to prepare the acrylic-functional polymers according to the method of the invention, described infra, the polyisobutylene polymer (A) must contain, or be modified to contain, at least one carbon-bonded silanol group (i.e., —C—SiOH).

According to the method of the present invention, the above described silanol-functional polymer can have its silanol groups located along the polymer chain or at the terminals thereof. Such silanol-functional polyisobutylenes are known in the art. For example, Japanese patent publication 70-53882 to Kanegafuchi discloses the hydrosilation of an allyl-functional PIB with an SiH— functional cyclic polysiloxane, followed by hydrolysis in the presence of a palladium catalyst. Further, an alkoxy-functional PIB may be hydrolyzed to provide the silanol-functional polymer. For other suitable methods for the synthesis of the silanol-functional polymer, the interested reader is referred to the article by P. D. Lickiss in *Advances in Inorganic Chemistry*, v. 42, p. 142 (1995).

Preferably, the silanol-functional polymer (A) is prepared by first silylating the corresponding allyl- or vinyl-functional polymer with a silane of the formula $$\text{HSiR}_{(3-x)}(Z)_x \qquad (ii)$$

followed by hydrolysis of the resulting hydrolyzable group-functional polymer. In formula (ii), R is as defined above, Z is a hydrolyzable group, such as halogen, alkoxy, acyloxy, alkenyloxy, oximo and aminoxy, inter alia, and x is 1 or 2. Preferably, Z is chlorine. This scheme is illustrated by the following two equations, wherein "(Polymer)-" represents the polymer chain residue and Z is chlorine.

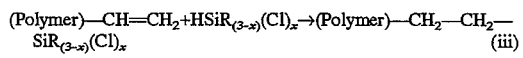

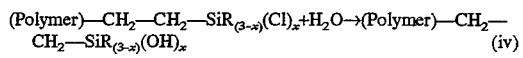

The first of these reactions is typically catalyzed by a hydrosilation catalyst, such as platinum on carbon, chloroplatinic acid or a platinum complex, as well known in the art. Typically, this reaction is carried out either neat or, preferably, in an organic solvent solution at a temperature of about 0° to 250° C., preferably about 20° to 150° C., most preferably at 40° to 100° C. When Z is the preferred chlorine group, the second (hydrolysis) reaction is generally carried out at about 0° to 60° C., preferably in the presence of a base such as sodium bicarbonate which is used to neutralize the hydrochloric acid generated.

In order to prepare the acrylic-functional polyisobutylene polymer of the invention, the silanol-functional polyisobutylene polymer (A), such as that shown formula (iv), is reacted with a silane (B) of the formula

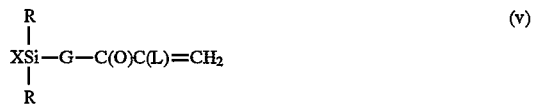

wherein R, G and L have their previously defined meanings. In formula (v), X is a silicon-bonded hydrolyzable group capable of condensing with the silanol group of (A) to form a siloxane (i.e., Si—O—Si) linkage or capable of hydrolyzing to form an SiOH group on silane (B) which can then condense with the SiOH of silanol-functional polymer (A) to form a siloxane linkage. These X groups may be selected from the hydrolyzable Z groups previously described in connection with silane (ii) used to prepare the silanol-functional polymer (A). Preferably X is again chlorine and the preferred silane (v) is either 3-acryloxypropyldimethylchlorosilane or 3-methacryloxypropyldimethylchlorosilane. The following equation illustrates this last reaction for the case where the silanol-functional polymer has the formula (iv):

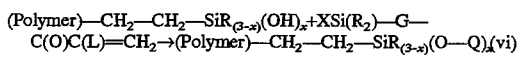

wherein Q is —Si(R₂)—G—C(O)C(L)═CH₂ and R, G, L and x have their previously defined meanings. This reaction is typically carried out in an organic solvent solution (e.g., tetrahydrofuran (THF), diethyl ether, chloroform, toluene hexane, or mixtures thereof). As the skilled artisan will appreciate, the reaction temperature used for this condensation will depend upon the particular X group, since some X react readily at room temperature while others require elevated temperatures or even the presence of a condensation catalyst to complete the reaction. The particular combination required is well within the knowledge of one of ordinary skill in the art and optimum combinations may be determined by routine experimentation. In a preferred embodiment, X is chlorine and the latter reaction is generally carried out in the presence of an acid acceptor, such as pyridine, triethylamine and dibutylamine, in order to neutralize the hydrochloric acid formed as a by product. In this embodiment, the reaction temperature is preferably about 0° to 100° C.

As mentioned above, a preferred polymer of the invention is a homopolymer consisting essentially of isobutylene units. Such a polyisobutylene (PIB), which contains one unsaturated group and which can readily be converted to a silanol-functional PIB and subsequently to an acrylic-functional PIB, according to the above described methods, is available commercially in a variety of molecular weights from, e.g., the Amoco Chemical Company (Chicago, Ill.) under the trade name Indopol™, from BASF Aktiengesellschaft (Germany) under the trade name Glissopal™ and from BP Chemicals Ltd. (London) under the trade name Ultravis™. Even more preferred, is telechelic PIB having approximately two such unsaturated groups (i.e., a functionality of about 2.0) which can be converted to silanol groups and, in turn, to acrylic groups. A telechelic PIB having allyl terminal groups may be prepared, e.g., by methods outlined by Kennedy et al. in U. S. Pat. No. 4,758,631.

The acrylic-functional polyisobutylenene polymers of the present invention which contain only one acrylic group find utility as intermediates in the preparation of graft copolymers with other acrylic-functional monomers.

When the polymer contains two or more acrylic groups, it may be used in a composition which can be cured by heat, visible light or UV radiation. In the case of heat cure, free-radical initiators such as benzoyl peroxide, azobisisobutyronitrile or meta-chloroperoxybenzoic acid are generally added. When a photocure is desired, a photoinitiator, such as 2-hydroxy-2-methyl-1-phenyl-propan-1-one, 2,2-dimethoxy-2-phenyl-acetyl-phenone, acetophenone, benzophenone, benzoin, benzil or a derivative thereof, is admixed with the acrylic-functional polymer and this dispersion is exposed to UV radiation according to procedures well known in the art. Further, it is also contemplated herein that the acrylic-functional polymers of the present invention can be cured by exposure to an electron beam or by the addition of an amine crosslinker (i.e., via a Michael addition reaction).

As discussed above, telechelic acrylic-functional polymers are preferred since they allow precise control of molecular weight between crosslinks and, therefore, the physical properties of the resulting cured product. These curable materials, particularly when formulated with crosslinkers, fillers, catalysts, pigments, stabilizers, inhibitors, and the like, can be used as sealants, adhesives or coatings for such applications as sealing insulating glass structures and wood and masonry protectant.

When the acrylic-functional polymer of the instant invention is formulated as a curable sealant composition (e.g., with an initiator and one or more of the above mentioned additional components) it is particularly useful in the fabrication of insulating glass (double-layered glass) constructions. These constructions consist of two or more glass sheets placed in superposition with an inert gas, partially evacuated or "dead air" space between the sheets. A curable sealant composition is generally interposed between the glass sheets and is located at the peripheral areas thereof. This sealant composition communicates with the interior surfaces of the glass sheets and, when the composition is cured, it bonds to these surfaces and forms a barrier which excludes moisture from the space between the sheets. There are many such insulating glass constructions known in the art and it is contemplated herein that any of these designs which rely on a curable sealant composition to exclude moisture from the space between glass sheets will benefit from the use of curable compositions comprising the acrylic-functional polyisobutylene polymers of the present invention since these adhere well to glass substrates and exhibit low moisture transmission rates. In this regard, those skilled in the art will, of course, appreciate that such insulating glass constructions may employ a continuous sealant section interposed between the glass surfaces or this sealant section may be interrupted by a rigid or elastomeric spacer (e.g., a glass-sealant-spacer-sealant-glass sandwich construction). An example of an insulating glass construction is described in U.S. Pat. No. 5,120,379 to Noda et al., hereby incorporated by reference.

In another embodiment of the present invention, the above acrylic-functional polymers can be dispersed in a water phase to form an aqueous emulsion (latex). A sufficient amount of a conventional non-ionic, cationic or anionic surfactant (or a mixture of the above) is admixed with the polymer of the invention, and any of the above mentioned optional ingredients, and this combination is then emulsified in water by mixing at high shear in, e.g., a homogenizer or Sonolator™. Alternatively, an aqueous emulsion of the acrylic-functional polymer may first be prepared by mixing the polymer with water and surfactant and then subjecting this combination to high shear. This emulsion may then be thoroughly mixed with other emulsified components, as desired for a given application.

As in the case of the neat acrylic-functional polymers described supra, these aqueous emulsions may be coated onto various substrates and cured thereon by exposure to heat, visible light or UV radiation using the appropriate initiator. Such a coating imparts a waterproof character to the substrate. Typical substrates which can be so coated include metals, such as aluminum, steel, iron and brass; masonry, such as concrete, marble and stone; cellulosics, such as paper, cotton, fiberboard, cardboard, wood and woven as well as non-woven fabrics; and plastics, such as polycarbonate.

EXAMPLES

The following examples are presented to further illustrate the compositions and method of this invention, but are not to be construed as limiting the invention, which is delineated in the appended claims. All parts and percentages in the examples are on a weight basis and all measurements were obtained at 25° C. unless indicated to the contrary.

In the examples, molecular weight of each polyisobutylene (PIB) was determined by gel permeation chromatography (GPC) using standard PIB samples for molecular weight calibration. $^{13}C$ and $^{29}Si$ Nuclear Magnetic Resonance (NMR) spectroscopy was used to confirm molecular structure.

Example 1

Telechelic allyl-functional polyisobutylene (PIB) was prepared by the method described in U.S. Pat. No. 4,758,631 to Kennedy, hereby incorporated by reference. This allyl-functional polyisobutylene had a number average molecular weight ($M_n$) of 5,050 and a weight average molecular weight ($M_w$) of 6,600. The degree of allyl end capping was determined by using signals from the aromatic carbon atoms of the polymerization initiator as internal reference in a $^{13}C$ NMR analysis, this functionality being 1.9±0.1. The allyl-functional PIB was, in turn, converted to a telechelic dimethylchlorosilyl-functional polyisobutylene by hydrosilation with dimethylchlorosilane, as follows.

Three hundred grams of the above allyl-functional PIB was dissolved in 200 g of toluene and charged to a three-neck flask fitted with a magnetic stirring bar, condenser and dropping funnel. A reaction product of chloroplatinic acid and divinyltetramethyldisiloxane (150 µl of a catalyst complex prepared according to U.S. Pat. No. 3,419,593 to Willing which contained about 4.22% Pt) was added and the solution was heated to 70° C. under an atmosphere consisting of about 2 volume percent of oxygen in nitrogen.

Dimethylchlorosilane was added dropwise. After about 1 ml of the silane had been introduced, the color of the solution changed to a golden yellow and heating was stopped. The addition rate of silane was then controlled so as to maintain a reaction temperature of 65° to 70° C. (total silane added= 28.35 g; 33.35 ml; addition time=30 minutes). The solution was stirred overnight at 70°–75° C. and the solvent and excess silane stripped off in a rotary evaporator at 85°–90° C./2–5 torr/3 hours. A pale yellow polymer was obtained. NMR analysis confirmed a PIB polymer wherein the allyl functionality was quantitatively converted to end groups of the formula —Si(Me$_2$)Cl, in which Me hereinafter represents a methyl radical. GPC indicated $M_n$=5,442; $M_w$=7,039.

Example 2

A one liter flask equipped with a magnetic stirring bar was charged with 300 g of the telechelic dimethylchlorosilyl-functional polyisobutylene prepared in Example 1 and 200 g of tetrahydrofuran (THF). The contents were warmed to 45°–50° C. and a solution of sodium bicarbonate in water (20 g in 200 g water) was added dropwise while stirring. This mixture was stirred for 1 hour. The organic and water layers were separated and the water layer was washed twice with 50 ml portions of THF, each of which was combined with the organic layer. The latter solution was dried over Na$_2$SO$_4$ overnight, filtered and the solvent removed using a rotary evaporator at 70° C. to yield 290 g of a pale yellow to off-white polymeric material. Analysis by $^{29}$Si NMR confirmed the presence of a telechelic dimethylsilanol-functional polyisobutylene having end groups of the formula —Si(Me$_2$)OH.

Example 3

A 250 ml, 3-neck flask equipped with a magnetic stirring bar, water condenser and a nitrogen purge was charged with 33 g of the telechelic dimethylsilanol-functional polyisobutylene prepared in Example 2, 40 g of tetrahydrofuran and 3.98 g (0.0176 mole) of 3-methacryloxypropyldimethylchlorosilane. Triethylamine (1.78 g; 0.011 mole) was added under an atmosphere of nitrogen. The mixture was heated at 60° C. for 30 minutes and stirred further for 60 minutes at room temperature. It was filtered through a pressure filter and the solvent and excess reactants were removed by vacuum distillation. An off-white polymeric material was obtained. It had the following structure, consistent with $^{13}$C and $^{29}$Si NMR analyses.

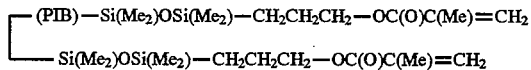

wherein PIB represents the residue of the polyisobutylene chain.

The above prepared methacrylate-functional telechelic polyisobutylene (4.25 g) was mixed with 0.127 g of Darocur® 1173 (2-hydroxy-2-methyl-1-phenyl-propan-1-one from Ciba-Geigy; Terrytown, N.Y.). This combination was coated onto glass as well as onto aluminum plates and each coated substrate was exposed to ultra violet light (Ultracure™ 100; 100 Watt lamp; Mercury Vapor). In each case, the coating gelled within about 10 seconds of UV exposure and was cured (i.e., an elastomeric film could be lifted off the substrate) within about 20 seconds of exposure.

Example 4

Glissopal™ 1000 was hydrosilylated with dimethylchlorosilane as follows. Glissopal™ 1000 is described as a polyisobutylene having a high proportion of terminal double bonds and having a number average molecular weight of about 1,180. It is a product of BASF Aktiengesellschaft (Germany). A blend of 400 g of Glissopal™ 1000 and 76 g of Me$_2$Si(H)Cl was placed in a flask and hydrosilated according to the procedure of Example 1 (200 μl catalyst used). The resulting hydrosilated product (105 g) was dissolved in 225 g of THF. Sodium bicarbonate solution (10% in water; 100 g) was slowly added. The mixture was shaken vigorously for 2 to 3 minutes. The water organic layers were separated and the latter was dried over Na$_2$SO$_4$ for 10 minutes. The salt byproduct was filtered through a pressure filter and the solvent was removed by vacuum distillation. A pale yellow polymeric material was obtained. IR and $^{29}$Si NMR showed the presence of SiOH groups but very little Si—O—Si structure. $M_w$ at this point was 2,180 and $M_n$ was 1,500.

The above described SiOH-functional PIB (97 g, 0.08 mole) was dissolved in tetrahydrofuran (125 g) and this solution was charged to a 500 ml 3-neck flask equipped with a magnetic stirring bar and a nitrogen purge. Triethylamine (12.24 g, 0.12 mole) was added under an atmosphere of nitrogen. 3-Methacryloxypropyldimethylchlorosilane (18 g, 0.08 mole) was slowly added and the mixture was stirred overnight at room temperature (RT). This product was filtered through a pressure filter and the solvent and excess reactants were removed by vacuum distillation. A pale yellow polymeric material was obtained which had a $M_w$ of 2,070 and $M_n$ of 1,540 and had a structure consistent with the formula

wherein PIB represents the residue of the polyisobutylene chain.

Example 5

The procedure of Example 1 was used to prepare a telechelic PIB having —Si(Me$_2$)Cl end groups. In this case, 400 g of the allyl-functional PIB were silylated with 45 ml of the dimethylchlorosilane using 200 g of toluene as solvent and 150 μl of the platinum complex as catalyst. The resulting polymer was isolated and then hydrolyzed according to the procedure of Example 2 using 30 g of NaHCO$_3$ in 300 g of water and 300 g of THF as solvent. Two portions (100 g each) of THF were used to wash the water phase. The resulting silanol-functional PIB had $M_n$=5,937 and $M_w/M_n$=1.356.

The above silanol-functional PIB (220 g) was reacted with 18.15 g of 3-Methacryloxypropyldimethylchlorosilane according to the procedure of Example 3 using 12 g of triethyl amine as the acid acceptor. The resulting telechelic acrylic-functional PIB (240 g) was stabilized with 4-methoxyphenol (50 mg/100 g polymer) and analysis indicated $M_n$=6,280 and $M_w/M_n$=1.32.

Example 6

A telechelic methacryloxy-functional polyisobutylene prepared in Example 3 (16.3 g) was charged to a Hauschild™ dental mixer cup. Nuodexoctoate cobalt 6%™ (0.064 g) was added and the contents were homogenized by mixing for 12 seconds. Nuodexoctoate cobalt 6%™ is described as a combination of 37% cobalt-2-ethylhexoate, 0.1% hydroquinone in 63% VM &P naphtha (Huls America, Piscataway, N.J.). A surfactant (0.489 g) having the following structure

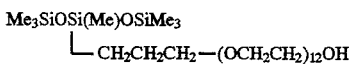

was added and the contents homogenized in two 12 second steps. The resulting dispersion of the surfactant in the acrylic-functional PIB was white and it was mixed with 6.3 g of deionized water. Part of the resulting emulsion (13.05 g) was further diluted by adding deionized water (15.27 g) to provide an emulsion having a solids content of about 30%. The average particle size of the dispersed organic phase was 1,049 nm.

The above emulsion was coated on various types of wood panels (pine, cedar, oak and ash) and these were, in turn, exposed to simulated sun light (i.e., including UV frequencies) in a hood. The surface of each coating was dry in 30 minutes. The coatings all cured within 24 hours.

Example 7

The procedure of Example 6 was repeated wherein 22 g of the telechelic methacryloxy-functional PIB were homogenized for 12 seconds with 0.098 g of the Nuodexoctoate cobalt 6%™ and 0.743 g of Zirconium octoate 12%™. Dioctyl sulfosuccinate sodium salt (0.297 g) and 1.12 g of Tergitol™ TMN-6 (50% in water) were added and the contents homogenized twice at 12 seconds each. Zirconium octoate 12%™ is described as a dispersion of zirconium octoate and 2-ethylhexanoic acid in aliphatic petroleum distillates (Huls America). Tergitol™ TMN-6 is a product of Union Carbide Corp. (Danbury, Conn.) and is described as an ethoxylated trimethylnonanol having an HLB of 11.7. The resulting emulsion was diluted by the addition of 89.41 g of deionized water and used to coat various substrates. After exposure to visible light (from a fluorescent tube) for 48 hours in a hood, the coatings were cured on the following substrates: paper, mortar, concrete, Tulip wood, marble (sticky), sand stone and cotton cloth.

That which is claimed is:

1. A method for preparing an acrylic-functional polyisobutylene polymer in which at least 50 mole percent of the repeat units are isobutylene units, said method comprising reacting (A) a polyisobutylene polymer in which at least 50 mole percent of the repeat units are isobutylene units and which contains at least one carbon-bonded silanol group in its molecule; and (B) a silane of the formula

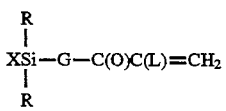

wherein R is independently selected from the group consisting of hydrocarbon groups having 1 to 14 carbon atoms and halogenated hydrocarbon groups having 1 to 10 carbon atoms, X is a hydrolyzable group, G is an alkylene oxide group having 1 to 4 carbon atoms and L is selected from the group consisting of hydrogen and an alkyl radical having 1 to 4 carbon atoms.

2. The method according to claim 1, wherein said polyisobutylene polymer (A) contains at least 80 mole percent isobutylene repeat units.

3. The method according to claim 2, wherein each R is methyl and X is chlorine.

4. An acrylic-functional polyisobutylene polymer prepared by reacting (A) a polyisobutylene polymer in which at least 50 mole percent of the repeat units are isobutylene units and which contains at least one carbon-bonded silanol group in its molecule; and (B) a silane of the formula

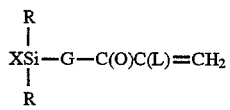

wherein R is independently selected from the group consisting of hydrocarbon groups having 1 to 14 carbon atoms and halogenated hydrocarbon groups having 1 to 10 carbon atoms, X is a hydrolyzable group, G is an alkylene oxide group having 1 to 4 carbon atoms and L is selected from the group consisting of hydrogen and an alkyl radical having 1 to 4 carbon atoms.

5. The acrylic-functional polyisobutylene polymer according to claim 4, wherein each R is methyl and L is selected from the group consisting of hydrogen and methyl.

6. The acrylic-functional polyisobutylene polymer according to claim 4, wherein X is chlorine.

7. The acrylic-functional polyisobutylene polymer according to claim 4, wherein said polymer (A) contains at least 80 mole percent isobutylene repeat units.

8. The acrylic-functional polyisobutylene polymer according to claim 7, wherein said polymer (A) is a silanol-functional polyisobutylene homopolymer.

9. The acrylic-functional polyisobutylene polymer according to claim 8, wherein said polymer (A) is a silanol-functional telechelic polyisobutylene.

10. The acrylic-functional polyisobutylene polymer according to claim 7, wherein G is represented by a formula selected from the group consisting of —$CH_2O$—, —$CH_2CH_2O$—, —$CH_2CH_2CH_2O$— and —$CH_2CH(CH_3)CH_2O$— and L is selected from the group consisting of hydrogen and methyl.

11. The acrylic-functional polyisobutylene polymer according to claim 8, wherein G is represented by a formula selected from the group consisting of —$CH_2O$—, —$CH_2CH_2O$—, —$CH_2CH_2CH_2O$— and —$CH_2CH(CH_3)CH_2O$— and L is selected from the group consisting of hydrogen and methyl.

12. The acrylic-functional polyisobutylene polymer according to claim 9, wherein G is represented by a formula selected from the group consisting of —$CH_2O$—, —$CH_2CH_2O$—, —$CH_2CH_2CH_2O$— and —$CH_2CH(CH_3)CH_2O$— and L is selected from the group consisting of hydrogen and methyl.

13. An acrylic-functional polyisobutylene polymer in which at least 50 mole percent of the repeat units are isobutylene units and having in its molecule at least one group of the formula (i)

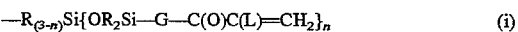 (i)

wherein R is independently selected from the group consisting of a hydrocarbon group having 1 to 14 carbon atoms and a halogenated hydrocarbon group having 1 to 10 carbon atoms, G is an alkylene oxide group having 1 to 4 carbon atoms, L is selected from the group consisting of hydrogen and an alkyl radical having 1 to 4 carbon atoms and n is 1 or 2.

14. The acrylic-functional polyisobutylene polymer according to claim 13, wherein said polyisobutylene polymer contains at least 80 mole percent isobutylene repeat units.

15. The acrylic-functional polyisobutylene polymer according to claim 14, wherein said polymer is a polyisobutylene homopolymer.

16. The acrylic-functional polyisobutylene polymer according to claim 15, wherein said polyisobutylene is telechelic polyisobutylene having said group (i) at each end of its molecule.

17. The acrylic-functional polyisobutylene polymer according to claim 13, wherein each R is methyl and L is selected from the group consisting of hydrogen and methyl.

18. An aqueous emulsion of the acrylic-functional polyisobutylene polymer according to claim 4.

19. An aqueous emulsion of the acrylic-functional polyisobutylene polymer according to claim 8.

20. An aqueous emulsion of the acrylic-functional polyisobutylene polymer according to claim 9.

21. A method for protecting a wood substrate comprising coating said substrate with a curable composition comprising the acrylic-functional polyisobutylene polymer according to claim 4 and curing said curable composition.

22. In an insulating glass construction comprising at least two glass sheets having a space therebetween and having a sealant composition interposed between said glass sheets and located at the peripheral areas thereof so as to exclude moisture from said space, the improvement wherein said sealant composition is a composition comprising the acrylic-functional isobutylene polymer according to claim 4, which sealant composition has been cured.

23. In a method for fabricating an insulating glass construction comprising at least two glass sheets having a space therebetween, said method comprising (i) interposing a curable sealant composition between said glass sheets, said curable sealant composition being located at the peripheral areas of said sheets so as to exclude moisture from said space; and (ii) curing said sealant composition, the improvement wherein said curable sealant composition is a composition comprising the acrylic-functional isobutylene polymer according to claim 4.

* * * * *